March 9, 1965        H. C. HARTUNG        3,172,576
BRAKE CONTROLLING NOZZLE HOLDER
Filed Feb. 9, 1961        3 Sheets-Sheet 1
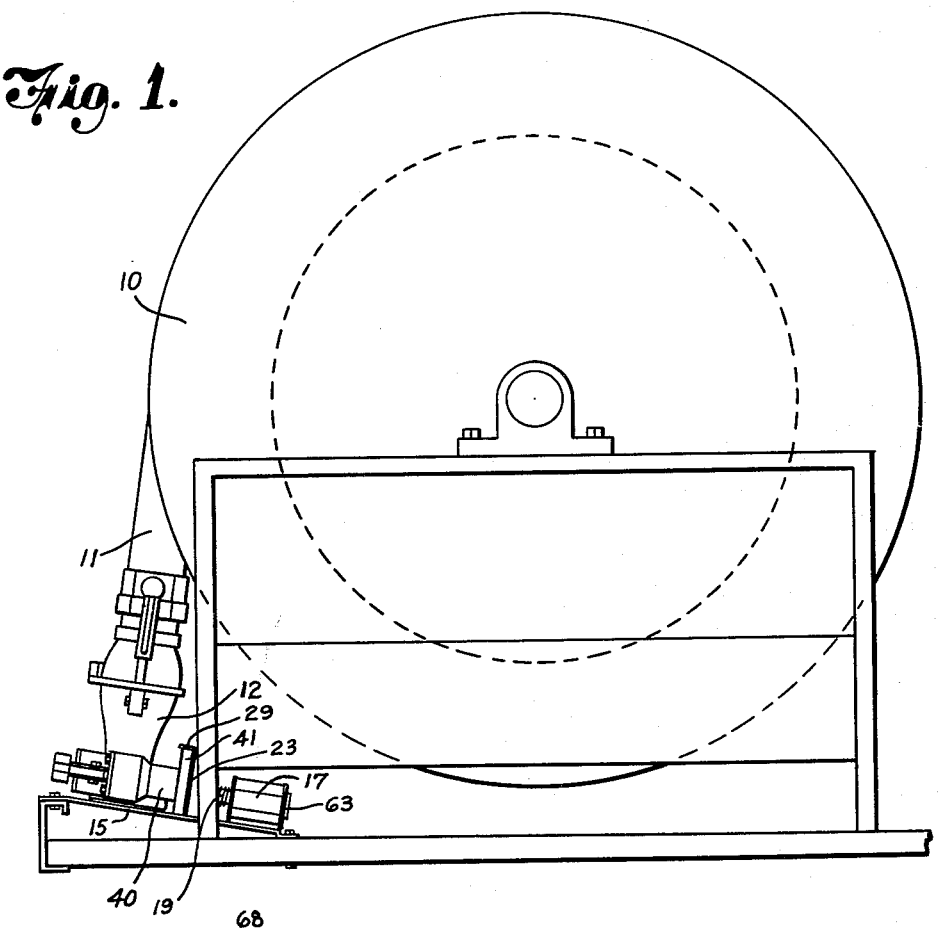
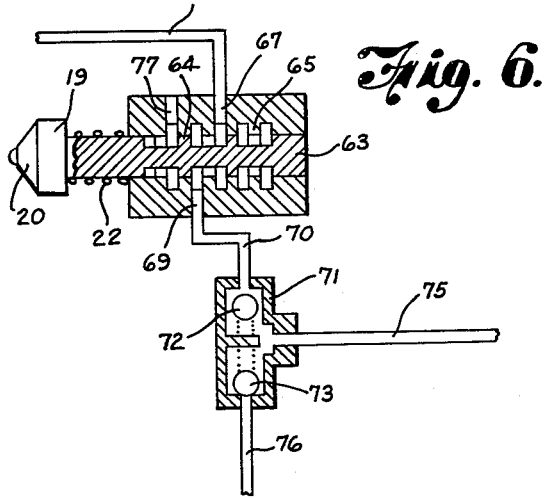
INVENTOR.
HOMER C. HARTUNG
BY
*Alfred R. Fuchs*
ATTORNEY March 9, 1965  H. C. HARTUNG  3,172,576
BRAKE CONTROLLING NOZZLE HOLDER
Filed Feb. 9, 1961  3 Sheets-Sheet 2
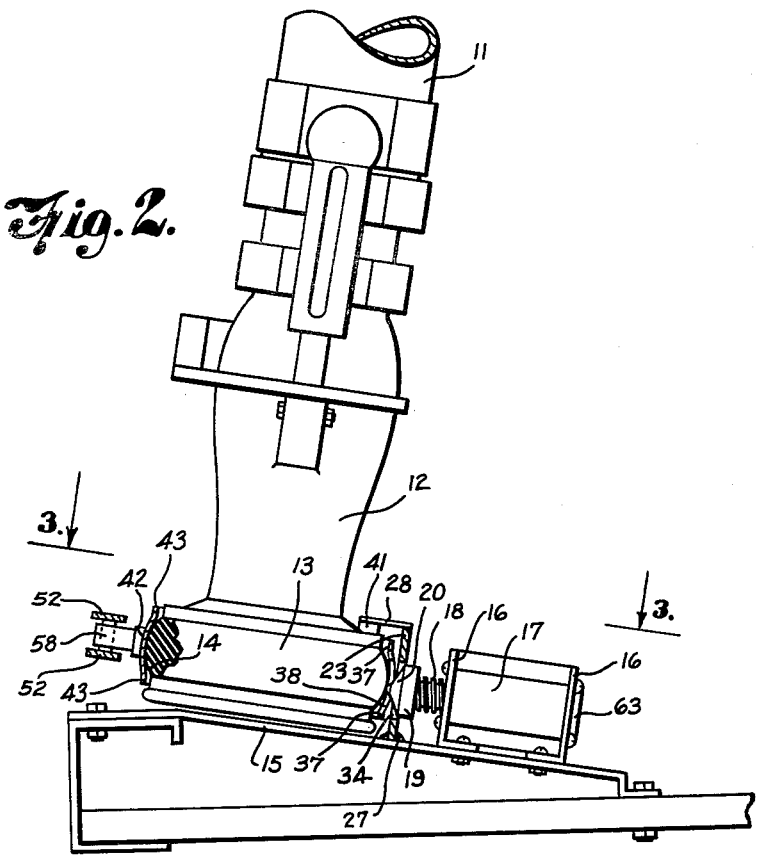
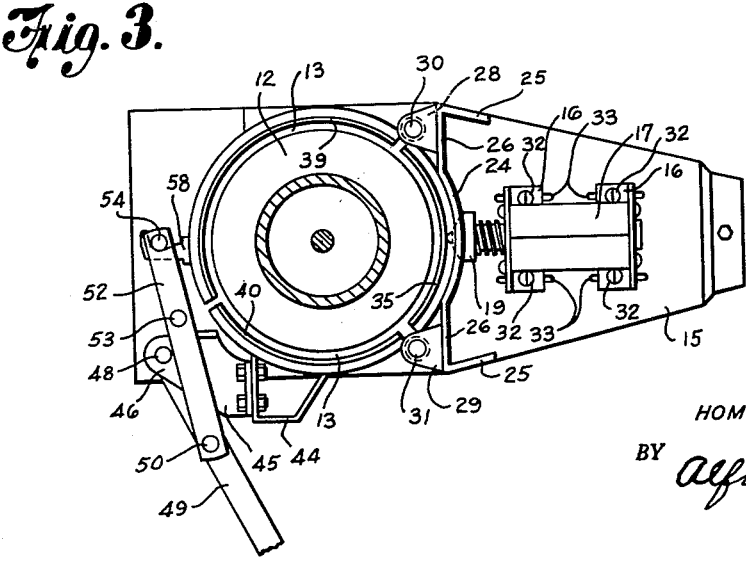
INVENTOR.
HOMER C. HARTUNG
BY Alfred R. Fuchs
ATTORNEY

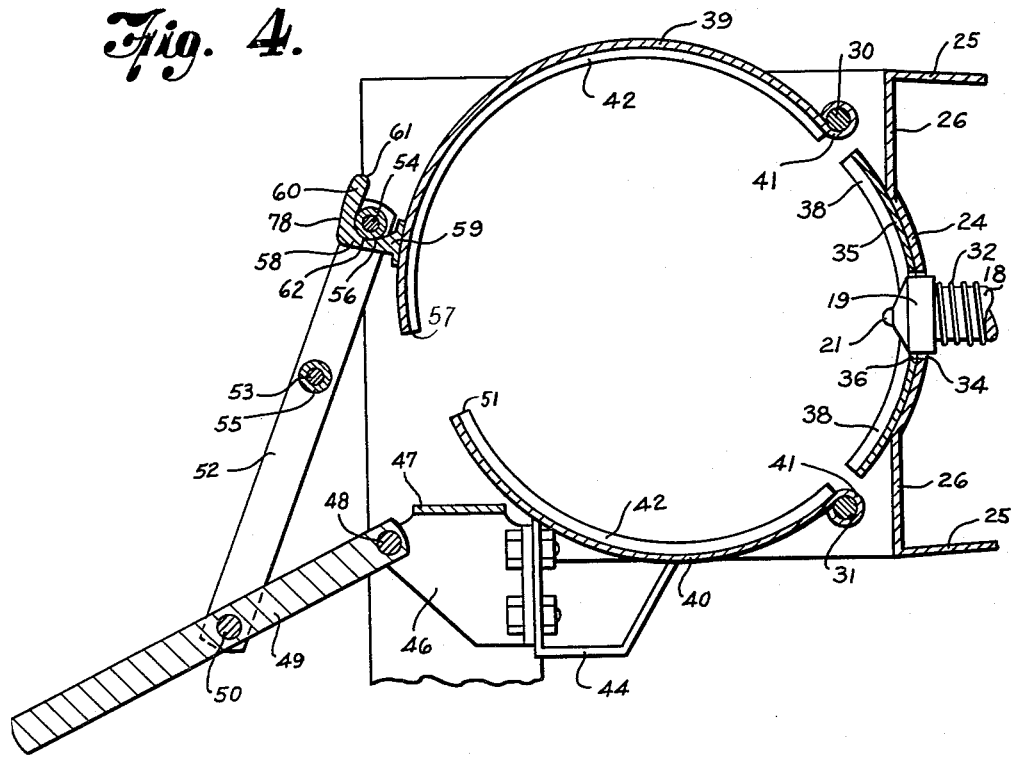
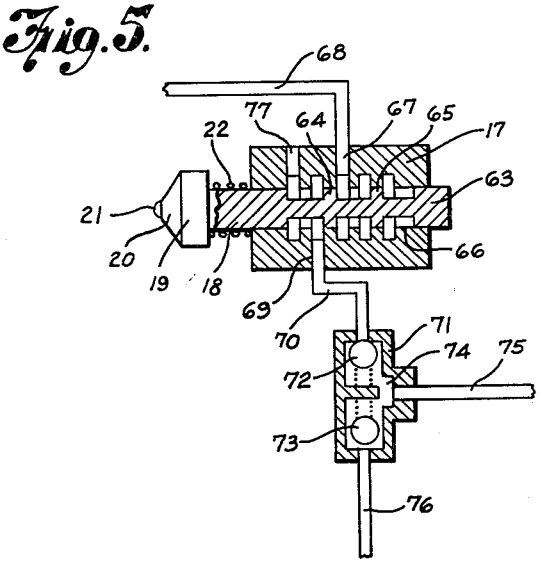

United States Patent Office 3,172,576
Patented Mar. 9, 1965

3,172,576
BRAKE CONTROLLING NOZZLE HOLDER
Homer C. Hartung, Claycomo, Mo., assignor, by mesne assignments, to Columbian Steel Tank Company, Kansas City, Mo., a corporation of Delaware
Filed Feb. 9, 1961, Ser. No. 88,141
10 Claims. (Cl. 222—192)

My invention relates to nozzle holders, and more particularly to means for clamping a nozzle in position against an operating member of brake controlling means.

In apparatus that is used for supplying fuel to airplanes, commonly referred to as refueling units, a hose which is mounted in position on a reel when it is not in use, having a suitable nozzle thereon, is utilized for filling wing tanks of airplanes and also for removing fuel therefrom, should it be desired to empty these tanks. Frequently a driver of a refueling unit will attempt to drive his refueling unit away from the airplane after the filling operation or fuel removing operation has been completed, without removing the nozzle from the tank. Such action on the part of the operator of the refueling unit can both damage the equipment on the refueling unit and the wing tank of the airplane. Furthermore the forceful disengagement of the nozzle from the wing tank because of failure to disconnect it in a normal manner and driving of the refueling unit away with a length of hose and nozzle dragging along behind the refueling unit can cause numerous accidents of various kinds, which are to be avoided.

In order that the operator of such a refueling unit can not drive away the vehicle without replacing the hose on the hose reel on the refueling unit and placing the nozzle in position in its holding means, I provide a mounting for said filling nozzle and an operating member for means for controlling the brakes of the refueling unit that are of such a character that only with the filling nozzle clamped in position in the holding means will the operating member for the brake controlling member be in position to permit release of the brakes. The operating member is preferably provided with a very strong spring to hold it in the position in which the brakes are kept locked, or in braking position. As a result the operating member can not be moved accidentally into brake releasing position nor can it be pushed and held in brake releasing position manually. It can only be moved into brake releasing position by the force of the clamping means of the holder urging the nozzle against the operating member in a direction such as to overcome the action of the spring.

More specifically my invention comprises a brake controlling element and a filling nozzle, the brake controlling element having a braking position and a brake releasing position, and means urging the operating member toward the braking position as well as means for clamping the filling nozzle against the operating member to hold the operating member out of braking position, said last mentioned means comprising a fixed nozzle receiving element having an opening therein through which the operating member is projected by means of the spring and a pair of nozzle receiving elements pivotally mounted each at one end thereof adjacent the opposite ends of the fixed nozzle receiving element and means for swinging the pivoted nozzle receiving elements toward the fixed element to crowd the nozzle toward the fixed element and into engagement with the operating member.

While the operating member is shown in the drawings as being associated directly with a valve, which controls the air supply to the brakes, the operating member could control the position of a switch, which in turn controls the position of such a valve.

In order to overcome the action of the spring in urging the operating member into braking position, clamping means is provided for moving the two pivoted nozzle receiving members into such position as to crowd the nozzle into engagement with the operating member, comprising a lever that is pivotally mounted at one end on a fixed pivot on one of the movable nozzle receiving elements and which is provided with a link pivoted thereto in spaced relation to the pivotal mounting of the lever at one end thereof and which is detachably connectable with the other movable nozzle receiving member near the end thereof that is remote from its pivotal mounting, the arrangement being such that the pivot connection between the link and the lever can be moved past dead center so as to hold the parts in locked position after the same have clamped the nozzle against the operating member for the brake controlling element.

The filling nozzle holder is mounted on suitable bracket means provided on the refueling vehicle adjacent the hose reel, and as the standard filling nozzle is provided with a rubber or other resilient material cushioning ring surrounding a portion thereof, which cushioning ring is convex on its outer surface, the nozzle receiving members are preferably made arcuate in character and have a transversely concave portion receiving the convexly curved portion of the cushioning ring to thus prevent any accidental disengagement of the nozzle from the holding means.

Other objects and advantages of my invention will appear as the description of the drawings proceeds. I desire to have it understood, however, that I do not intend to limit myself to the particular details described or shown except as defined by the claims.

In the drawings:

FIG. 1 is a view in side elevation of a hose reel and my improved nozzle holding means.

FIG. 2 is a view partly in elevation and partly in section of my nozzle holding means, showing a nozzle in position therein.

FIG. 3 is a section taken on the line 3—3 of FIG. 2.

FIG. 4 is a horizontal sectional view through the nozzle holder in an open position.

FIG. 5 is a diagrammatic view of the brake controlling means and the operating member therefor in a brake releasing position, and FIG. 6 is a similar view thereof in braking position.

Referring in detail to the drawings, in FIG. 1 is shown a hose reel 10, which has a hose 11 coiled thereon, which hose is provided with a filling nozzle 12. The filling nozzle has an end portion that is provided with a ring-like cushioning member 13 thereon that is made of rubber or similar material, and which has a transversely convex outer surface 14. Mounted on the vehicle adjacent the hose reel 10 is a bracket 15, which is provided with a suitable mounting, such as the angle members 16, for a brake controlling element which is shown as being in the form of a valve 17, which has an operating member 18 projecting therefrom provided with a head 19, which is shown as having a cone-shaped outer end 20 terminating in an end projection 21. While the exact shape of the operating member may be varied, it is necessary that it be provided with some sort of an abutment similar to the head 19 so that a strong compression coil spring 22 can be mounted between the end of the valve body 17 and the head 19 to urge the valve member into the position shown in FIG. 6.

Also provided on the bracket 15 is an upstanding bracket 23, which has a curved central portion 24, obliquely extending end portions 25 and straight portions 26 connecting the curved portion 24 with the end portions 25, said bracket being welded, preferably as at 27, to the bracket 15. Ears 28 and 29 extend from the upper edge portion of the bracket 23 and pivot pins 30 and 31 are mounted in said brackets and in the bracket 15. The angle members 16 are secured to the top surface of the bracket 15 by securing elements 32 that extend through slots 33 in the bracket 15 to permit adjustment of the valve member 17 axially of the operating member 18 so as to adjust the position of the head 19 of the operating member relative to the bracket 23, said bracket being provided with an opening 34 therein of sufficient size for the head 19 to pass therethrough.

Mounted in fixed position on the curved portion 24 of the bracket 23 is a fill nozzle receiving member 35, which is arcuate in character and which is secured to the bracket 23 in any desired manner, such as by welding or riveting. Said arcuate nozzle receiving member 35 has an opening 36 therein of a size that the head 19 of the valve controlling element operating member will project into the same. Said fixed nozzle receiving member has cylinderical marginal portions 37 and a central transversely concavo-convex portion 38. The inner concave surface of the fixed nozzle receiving member 35 is adapted to receive the outer convex surface 14 of the cushioning member 13 closely.

Cooperating with the fixed nozzle receiving member 35 are pivoted nozzle receiving members 39 and 40, which are provided with sleeve portions 41 at one end of each thereof that extend between the bracket 28 and the bracket 15, and brackets 29 and 15, respectively, and embrace the pivot pins 30 and 31, respectively, to pivotally mount the members 39 and 40 on the bracket 23. Each of said pivotally mounted nozzle receiving members is provided with a central concavo-convex portion 42 and marginal cylindrical portions 43 and are of an arcuate character. All said nozzle receiving members 35, 39 and 40 are thus of the same cross sectional contour and when in clamping position will embrace the nozzle.

Mounted on said nozzle receiving member 40 is a bracket 44, and bolted to the bracket 44 is a U-shaped bracket 45, which is provided with a pair of pivot ears 46 connected by means of a transversely extending portion 47 and having a pivot pin 48 extending between the same. Mounted on the pivot pin 48 is one end of a lever 49, which also is provided with a pivot pin 50 between the ends thereof in spaced relation to the pivot 48. The bracket 44 is spaced from the end 51 of the nozzle receiving member 40 that is remote from the pivot pin 31, and the ears 46 are of such height that the axis of the pivot 48 is located outwardly beyond the nozzle receiving member 40 and spaced from the end 51 of said nozzle receiving member 40.

Mounted on the pivot pin 50 is a pair of bars 52, which are located one on each side of the lever 49, and are held in properly spaced relation to each other by means of cross pins 53 and 54 surrounded by spacing sleeves 55 and 56. The bars 52 thus form a bifurcated link that is pivoted at one end thereof on the lever 49 by means of the pivot pin 50. Mounted in spaced relation to the end 57 of the nozzle receiving member 39 is a projecting hook-like member 58, which has a base portion 59 secured to the outer face of the nozzle receiving member 39 and has a projecting finger portion 60 that has a rounded end 61 and an obliquely extending surface 78 extending from the body portion of the member 58 part of the way toward the rounded end portion 61. Said hook-like member is provided with a concavely curved portion 62 providing a seat for the sleeve 56 on the cross pin 54.

It will be obvious that when it is desired to clamp the nozzle 12 in position in the nozzle holder the bifurcated link can be engaged with the hook bracket 58 in the manner shown in FIG. 4 with the nozzle in position between the nozzle receiving members 39, 40 and 35. The lever 49 can then be swung from a position shown in FIG. 4 to the position shown in FIG. 3, whereupon the cushioning member 13 on the nozzle will be forced tightly into engagement with the fixed nozzle receiving member 35 and will crowd the operating member 18, by engagement with the head 19 thereof at the end 21 of said head, toward the right as viewed in the drawings, or from the position shown diagrammatically in FIG. 6 to that shown in FIG. 5, moving the valve or other controlling member for the brakes from the position shown in FIG. 6 to that shown in FIG. 5.

The valve body 17 can be of any desired character, but is shown as having a movable valve member 63, which is provided with portions 64 and 65 that slidably engage in the passage 66 in the valve body so as to provide an air tight joint between these portions of the valve member 63 and the wall of the passage 66. The operating member 18 also slidably engages in the passage 66, as does the end of the valve 63 remote from the operating member 18. A passage 67 leads into the passage 66 and a compressed air supply line 68 leads into the passage 67. Said valve is also provided with a passage 69 therein, with which a conduit 70 is connected, which extends to a double check valve member 71, which is provided with spring loaded ball check valves 72 and 73 and a connecting passage 74 leading to the brake line 75. A line 76 also leads into the valve member 71, which extends from suitable brake controlling means for manually supplying compressed air to the valve member 71. With the parts in the position shown in FIG. 6, the compressed air line 68 is connected through the valve member 63 with the conduit 70 and thus with the valve 71, unseating the ball valve 72 and supplying air under pressure to the brake line 75, the valve 73 being seated so as to keep the connection between the line 76 and the brake line 75 closed unless the manually controlled means is operated to supply air under a higher pressure through the pipe 76 than through the conduit 70. However, as long as the valve 63 is in the position shown in FIGURE 6, air under pressure will be supplied to the brake line 75 and the brakes will remain in locked or braking position. Thus the position of the valve shown in FIG. 6 is the braking position of the valve.

However, when the nozzle is clamped to the operating member 18 and the operating member has been thereby moved to the position shown in FIG. 5, the partition 64 on the valve member 63 will shut the compressed air line 68 off from the passage 69 and no compressed air will be supplied to the conduit 70. Furthermore, since the passage 77 in the valve member 17 leads to the outer air any air under pressure that is in the conduit 70 will be vented to the outer air in this position of the valve member 63, and accordingly the ball valve 72 will be held seated by the spring engaging the same, while the ball valve 73 will be unseated if air under pressure is supplied through the pipe 76 by operation of the manually controlled valve, the brakes then being under the control of the operator of the vehicle and the brake controlling element provided in the valve 17 will then be in a brake releasing position.

What I claim is:

1. The combination with a brake controlling element and a filling nozzle of a projecting operating member for said brake controlling element having a braking position and a brake releasing position, means urging said operating member toward braking position and means for rigidly clamping said filling nozzle against said operating member to hold said operating member out of braking position comprising a rigid fixed nozzle receiving element having an opening therein through which said operating member projects, a pair of rigid nozzle receiving elements pivotally mounted at one end thereof adjacent the opposite ends of said fixed nozzle receiving element, said fixed and movable nozzle receiving elements being adapted to rigidly embrace said nozzle, and means for swinging said pivoted nozzle receiving elements toward said fixed element to crowd said nozzle toward said fixed element and rigidly hold said nozzle in engagement with said operating member comprising a lever pivotally mounted at one end thereof on a pivot mounted in fixed position on one of said movable nozzle receiving elements, a link pivotally mounted on said lever in spaced relation to said pivoted end of said lever and detachably engaging said other pivoted nozzle receiving member adjacent the end thereof remote from its pivoted end.

2. The combination with a brake controlling element and a filling nozzle of a projecting operating member for said brake controlling element having a braking position and a brake releasing position, means urging said operating member toward braking position and rigid means for clamping said filling nozzle against said operating member to hold said operating member out of braking position comprising an arcuate rigid fixed nozzle receiving element having an opening therein through which said operating member projects, a pair of arcuate rigid nozzle receiving elements pivotally mounted at one end thereof adjacent the opposite ends of said fixed nozzle receiving element, said fixed and movable nozzle receiving elements being adapted to rigidly encircle said nozzle, and means for swinging said pivoted nozzle receiving elements toward said fixed element into rigid encircling relation with said nozzle to crowd said nozzle toward said fixed element and into engagement with said operating member comprising a lever pivotally mounted at one end thereof on a pivot mounted in fixed position on one of said movable nozzle receiving elements, a link pivotally mounted on said lever in spaced relation to said pivoted end of said lever and detachably engaging said other pivoted nozzle receiving member adjacent the end thereof remote from its pivoted end.

3. The combination with a brake controlling element and a filling nozzle of a projecting operating member for said brake controlling element having a braking position and a brake releasing position, means urging said operating member toward braking position and rigid means for clamping said filling nozzle against said operating member to hold said operating member out of braking position comprising an arcuate rigid fixed nozzle receiving element having an opening therein through which said operating member projects, a pair of arcuate rigid nozzle receiving elements each pivotally mounted at one end thereof adjacent one of the opposite ends of said fixed nozzle receiving element, said fixed and movable nozzle receiving elements being provided with a transversely concave nozzle receiving portion and being adapted to rigidly encircle said nozzle, and means for swinging said pivoted nozzle receiving elements toward said fixed element into rigid encircling relation with said nozzle to crowd said nozzle toward said fixed element and into engagement with said operating member comprising a lever pivotally mounted at one end thereof on a pivot mounted in fixed position on one of said movable nozzle receiving elements, a link pivotally mounted on said lever in spaced relation to said pivoted end of said lever and detachably engaging said other pivoted nozzle receiving member adjacent the end thereof remote from its pivoted end.

4. The combination with a brake controlling element and a filling nozzle of a projecting operating member for said brake controlling element having a braking position and a brake releasing position, means urging said operating member toward braking position and rigid means for clamping said filling nozzle against said operating member to hold said operating member out of braking position comprising an arcuate rigid fixed nozzle receiving element having an opening therein through which said operating member projects, a pair of arcuate rigid nozzle receiving elements, a fixed pivot mounted adjacent each end of said fixed nozzle receiving element, each of said pair of nozzle receiving elements being pivotally mounted at one end thereof on one of said fixed pivots, a bracket rigidly mounted on one of said pivotally mounted nozzle receiving elements, a pivot mounted in fixed position on said bracket, a lever pivotally mounted at one end thereof on said last mentioned pivot, a link pivotally connected at one end thereof with said lever in spaced relation to the pivoted end of said lever, said lever having a position in which the pivotal connection with said link is on the side of the pivotal axis of said lever remote from said fixed nozzle receiving element, and means on said other pivoted nozzle receiving element adjacent the end thereof remote from its pivot detachably engageable with the other end of said link in said position of said lever, said fixed and pivoted nozzle receiving elements encircling said nozzle upon engagement of said last mentioned means with said link, said lever being movable to a position in which said pivotal connection with said link is on the side of the pivotal axis of said lever toward said fixed nozzle receiving element and said arcuate elements are rigidly held in nozzle encircling clamping position.

5. The combination with a brake controlling element and a filling nozzle of a projecting operating member for said brake controlling element having a braking position and a brake releasing position, means urging said operating member toward braking position and rigid means for clamping said filling nozzle against said operating member to hold said operating member out of braking position comprising an arcuate rigid fixed nozzle receiving element having an opening therein through which said operating member projects, a pair of arcuate rigid nozzle receiving elements, a fixed pivot mounted adjacent each end of said fixed nozzle receiving element, each of said pair of nozzle receiving elements being pivotally mounted at one end thereof on one of said fixed pivots, a bracket rigidly mounted on one of said pivotally mounted nozzle receiving elements, a pivot mounted in fixed position on said bracket, a lever pivotally mounted at one end thereof on said last mentioned pivot, a bifurcated link pivotally connected at one end thereof with said lever in spaced relation to the pivoted end of said lever, said lever having a position in which the pivotal connection with said link is on the side of the pivotal axis of said lever remote from said fixed nozzle receiving element, a cross pin adjacent the other end of said link, and a hook projecting from said other pivoted nozzle receiving element adjacent the end thereof remote from its pivot detachably engageable with said cross pin in said position of said lever, said fixed and pivoted nozzle receiving elements encircling said nozzle upon engagement of said cross pin with said hook, said lever being movable to a position in which said pivotal connection with said link is on the side of the pivotal axis of said lever toward said fixed nozzle receiving element and said arcuate elements are rigidly held in nozzle encircling clamping position.

6. The combination with a brake controlling element and a filling nozzle of a projecting operating member for said brake controlling element having a braking position and a brake releasing position, means urging said operating member toward braking position and rigid means for clamping said filling nozzle against said operating member to hold said operating member out of braking position comprising an arcuate rigid fixed nozzle receiving element having an opening therein through which said operating member projects, a pair of arcuate rigid nozzle receiving elements, a fixed pivot mounted adjacent each end of said fixed nozzle receiving element, each of said pair of nozzle receiving elements being pivotally mounted at one end thereof on one of said fixed pivots, all said nozzle receiving elements being provided with a transversely concave nozzle receiving portion, a bracket rigidly mounted on one of said pivotally mounted nozzle receiving elements, a pivot mounted in fixed position on said bracket, a lever pivotally mounted at one end thereof on said last mentioned pivot, a link pivotally connected at one end thereof with said lever in spaced relation to the pivoted end of said lever, said lever having a position in which the pivotal connection with said link is on the side of the pivotal axis of said lever remote from said fixed nozzle receiving elements, and means on said other pivoted nozzle receiving element adjacent the end thereof remote from its pivot detachably engageable with the other end of said link in said position of said lever, said fixed and pivoted nozzle receiving elements encircling said nozzle upon engagement of said last mentioned means with said link, said lever being movable to a position in which pivotal connection with said link is on the side of the pivotal axis of said lever toward said fixed nozzle receiving element and said arcuate elements are rigidly held in nozzle encircling clamping position.

7. The combination with a controlling element and a filling nozzle of an operating member for said controlling element having alternate positions, means urging said operating member toward one position and means for rigidly clamping said filling nozzle against said operating member to hold said operating member against movement toward said position comprising an arcuate rigid fixed nozzle receiving element having an opening therein through which said operating member projects, a pair of arcuate rigid nozzle receiving elements, a fixed pivot mounted adjacent each end of said fixed nozzle receiving element, each of said pair of nozzle receiving elements being pivotally mounted at one end thereof on one of said fixed pivots, all said nozzle receiving elements being provided with a transversely concave nozzle receiving portion, a bracket rigidly mounted on one of said pivotally mounted nozzle receiving elements, a pivot mounted in fixed position on said bracket, a lever pivotally mounted at one end thereof on said last mentioned pivot, a bifurcated link pivotally connected at one end thereof with said lever in spaced relation to the pivoted end of said lever, said lever having a position in which the pivotal connection with said link is on the side of the pivotal axis of said lever remote from said fixed nozzle receiving element, a cross pin adjacent the other end of said link, and a hook projecting from said other pivoted nozzle receiving element adjacent the end thereof remote from its pivot detachably engageable with said cross pin in said position of said lever, said fixed and pivoted nozzle receiving elements encircling said nozzle upon engagement of said cross pin with said hook, said lever being movable to a position in which said pivotal connection with said link is on the side of the pivotal axis of said lever toward said fixed nozzle receiving element and said arcuate elements are rigidly held in nozzle encircling clamping position.

8. The combination with a filling nozzle of a controlling means operating member having alternate positions, means urging said operating member toward one of said positions, and a circular clamp for said nozzle comprising a plurality of arcuate grooved rigid sections, a bracket having one of said sections rigidly mounted thereon, said section having an opening therein, said operating member being mounted on said bracket in a position to project through said opening, a fixed pivot on said bracket adjacent each end of said rigidly mounted section, one of said other sections being mounted adjacent one end thereof on each of said fixed pivots to swing thereon toward and way from said rigidly mounted section, a lever, means on one of said sections for pivotally mounting said lever at one end thereof to swing about an axis adjacent the other end of said section but spaced outwardly from said section, a link pivotally connected at one end thereof with said lever, hook means on the other pivoted section adjacent but spaced from the end of said section remote from its pivot and means on the other end of said link detachably engageable with said hook means, said lever being swingable about its pivot between a position in which the pivotal connection of the link therewith is on the side of the pivotal axis of said lever remote from said rigidly mounted section in a position for engagement of the means thereon with said hook means and a position in which the pivotal connection of the link therewith is on the side of said pivotal axis of said lever toward said rigidly mounted section and said sections are rigidly held in clamping engagement with said nozzle and said nozzle is rigidly clamped against said projecting operating member to hold the same in its other position.

9. The combination with a filling nozzle of a controlling means operating member having alternate positions, means urging said operating member toward one of said positions and a circular clamp for said nozzle comprising a plurality of arcuate grooved rigid sections, a bracket having one of said sections rigidly mounted thereon, said section having an opening therein, said operating member being mounted on said bracket in a position to project through said opening, a fixed pivot on said bracket adjacent each end of said rigidly mounted section, one of said other sections being mounted adjacent one end thereof on each of said fixed pivots to swing thereon toward and away from said rigidly mounted section, a lever, means on one of said sections for pivotally mounting said lever at one end thereof to swing about an axis adjacent the other end of said section but spaced outwardly from said section, a bifurcated link pivotally connected at one end thereof with said lever in embracing relation thereto, hook means on the other pivoted section adjacent but spaced from the end of said section remote from its pivot and means on the other end of said link detachably engageable with said hook means, said lever being swingable about its pivot between a position in which the pivotal connection of the link therewith is on the side of the pivotal axis of said lever remote from said rigidly mounted section in a position for engagement of the means thereon with said hook means and a position in which the pivotal connection of the link therewith is on the side of said pivotal axis of said lever toward said rigidly mounted section and said sections are rigidly held in clamping engagement with said nozzle and said nozzle is rigidly clamped against said projecting operating member to hold the same in its other position, said link, lever and hook means being so related that said link passes across the pivotal mounting of said lever in its movement to and from clamping position.

10. The combination with a filling nozzle of a controlling means operating member having alternate positions, means urging said operating member toward one of said positions and a circular clamp for said nozzle comprising a plurality of arcuate grooved rigid sections, a bracket having one of said sections rigidly mounted thereon, said section having an opening therein, said operating member being mounted on said bracket in a position to project through said opening, a fixed pivot on said bracket adjacent each end of said rigidly mounted section, one of said other sections being mounted adjacent one end thereof on each of said fixed pivots to swing thereon toward and away from said rigidly mounted section, a lever, means on one of said sections for pivotally mounting said lever at one end thereof to swing about an axis adjacent the other end of said section but spaced outwardly from said section, a bifurcated link pivotally connected at one end thereof with said lever, hook means on the other pivoted section adjacent but spaced from the end of said section remote from its pivot, said hook means comprising a concavely curved socket portion and a projecting finger portion spaced from said section and said link having a cross bar extending across the same adjacent the end thereof remote from its pivotal connection with said lever and a spacing sleeve on said cross bar, said spacing sleeve being adapted to be seated in said socket portion, said lever being swingable about its pivot between a position in which the pivotal connection of the link therewith is on the side of the pivotal axis of said lever remote from said rigidly mounted section in a position for engagement of said spacing sleeve with said socket portion and a position in which the pivotal connection of the link therewith is on the side of said pivotal axis of said lever toward said rigidly mounted section and said sections are rigidly held in clamping engagement with said nozzle and said nozzle is rigidly clamped against said projecting operating member to hold the same in its other position.

References Cited in the file of this patent

UNITED STATES PATENTS

| | | |
|---|---|---|
| 2,847,023 | Hansen et al. | Aug. 12, 1958 |
| 2,871,872 | Rowles | Feb. 3, 1959 |

FOREIGN PATENTS

| | | |
|---|---|---|
| 619,757 | France | Jan. 5, 1927 |